US006664203B2

(12) United States Patent
Nagashima et al.

(10) Patent No.: US 6,664,203 B2
(45) Date of Patent: Dec. 16, 2003

(54) ALKALI FREE GLASS, PRODUCTION METHOD THEREFOR, AND FLAT DISPLAY PANEL USING THE SAME

(75) Inventors: Yukihito Nagashima, Osaka (JP); Yoshikazu Toshikiyo, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 25 days.

(21) Appl. No.: 10/023,752

(22) Filed: Dec. 21, 2001

(65) Prior Publication Data

US 2002/0123420 A1 Sep. 5, 2002

(30) Foreign Application Priority Data

Dec. 25, 2000 (JP) ........................ P.2000-391731

(51) Int. Cl.[7] .......................... C03C 3/091; C03C 3/093
(52) U.S. Cl. ........................... 501/66; 501/67; 501/69; 501/70; 501/72
(58) Field of Search .................. 501/66, 67, 69, 501/70, 72

(56) References Cited

U.S. PATENT DOCUMENTS

| | | | | |
|---|---|---|---|---|
| 5,824,127 A | * | 10/1998 | Bange et al. | 65/90 |
| 6,096,670 A | * | 8/2000 | Lautenschlager et al. | 501/67 |
| 6,319,867 B1 | * | 11/2001 | Chacon et al. | 501/66 |
| 6,329,310 B1 | * | 12/2001 | Peuchert et al. | 501/66 |
| 6,417,124 B1 | * | 7/2002 | Peuchert et al. | 501/66 |
| 6,465,381 B1 | * | 10/2002 | Lautenschlager et al. | 501/67 |

FOREIGN PATENT DOCUMENTS

JP       10-059741 A    *   3/1998

* cited by examiner

Primary Examiner—David Sample
(74) Attorney, Agent, or Firm—Sughrue Mion, PLLC

(57) ABSTRACT

The present invention can provide an alkali free glass containing as a refining agent, a tin oxide and at least one selected from the group consisting of a cerium oxide, a manganese oxide, a tungsten oxide, a tantalum oxide and a niobium oxide.

8 Claims, No Drawings

ALKALI FREE GLASS, PRODUCTION METHOD THEREFOR, AND FLAT DISPLAY PANEL USING THE SAME

FIELD OF THE INVENTION

The present invention relates to an alkali free glass preferable for various kinds of flat display panels such as a TFT (Thin Film Transistor) liquid crystal display panel, various kinds of flat display panel using the same, and a method for producing the alkali free glass. Moreover, it ultimately relates to an alkali free glass not containing an arsenic or an antimony oxide, which is ordinarily used as a refining agent, various kinds of flat display panel using the same, and a method for producing the alkali free glass.

BACKGROUND OF THE INVENTION

At the time of melting a glass material, in general, a so-called refining agent having an effect of growing bubbles by a gas generation by the decomposition thereof and promoting removal of the bubbles contained in the molten glass, is added in the initial stage of a step for melting the batch. Moreover, the components also have an effect of absorbing the gas in residual minute bubbles and promoting elimination thereof.

As such a refining agent, in the case of an alkali free glass, in general, an arsenious oxide ($As_2O_3$) and an antimony trioxide ($Sb_2O_3$) are used. The $As_2O_3$ provides a refining function owing to the effect that the $As_2O_3$ added to the batch derives the oxygen from the vicinity in a temperature raising process so as to be an $As_2O_5$, and releases the oxygen at the time of returning to the $As_2O_3$ at a higher temperature. Therefore, in the case of using an arsenious oxide as a refining agent, in order to promote the change from the $As_2O_3$ to the $As_2O_5$ at an initial stage of the material melting reaction, a nitrate is also added in the glass batch as an oxidizing agent. The same is applied to the case of the $Sb_2O_3$.

Recently, in various fields, use of hazardous substances tends to be reduced. Also in the field of the glass refining agent, movement of replacing the poisonous and highly hazardous $As_2O_3$ with the less hazardous $Sb_2O_3$ is being spread. Moreover, this movement is remarkable in the field of alkali free glass mainly used as an optical glass or a TFT liquid crystal display glass substrate, wherein the $As_2O_3$ has been used ordinarily as the refining agent.

Moreover, in the field of the alkali free glass among the fields wherein the replacement of the $As_2O_3$ with the $Sb_2O_3$ is promoted, according to the performance of the TFT liquid crystal or change of the production step thereof, a composition with a higher thermal resistance is used. That leads to rise of the glass melting temperature. Accordingly, in the case the $Sb_2O_3$ is used as the refining agent for refining a glass requiring a high melting temperature, the $Sb_2O_3$ is required to be added in a larger amount. Furthermore, in order to strengthen the refining effect of the $Sb_2O_3$, it may be used in combination with other components.

For example, in the alkali free glass and the production method therefor disclosed in JP-A-10-114538 (the term "JP-A" as used here in means an "unexamined published Japanese Patent"), 0.05 to 3% of an $Sb_2O_3$ and 0.05 to 2% of an $SnO_2$ based on % by weight are added as the refining agent.

In the alkali free glass and the production method therefor disclosed in JP-A-10-231139, 0.05 to 3% of an $Sb_2O_3$ and 0.01 to 2% of a chloride in terms of $Cl_2$ are added as the refining agent.

Moreover, although it is not as serious as the case of the $As_2O_3$, the $Sb_2O_3$ also is hazardous, and an alkali free glass using neither the $As_2O_3$ nor $Sb_2O_3$ and a production method therefor have been proposed.

For example, in the alkali free glass disclosed in JP-A-9-110460, 0.5% by weight or less of a fluoride in terms of F is added at the time of preparing the glass batch.

In the alkali free glass and the production method therefor disclosed in JP-A-10-25132, 0.005 to 1.0% by weight of a sulfate in terms of $SO_3$ and 0.01 to 2.0% by weight of a chloride in terms of $Cl_2$ are added as the refining agent.

Moreover, in the alkali free glass and the production method therefor disclosed in JP-A-10-59741, 0.05 to 2.0% by weight of an $SnO_2$ is added as a refining agent.

In the alkali free glass disclosed in the U.S. Pat. No. 6,096,670, it is described that use of an $SnO_2$ and a $CeO_2$ in combination is effective as a refining agent in a production method using a float method and a dawn drawing method.

However, in the alkali free glass and the production method therefor disclosed in JP-A-10-114538, although the $SnO_2$ is added at the same time for reinforcing the refining effect of the $Sb_2O_3$, the refining effect comparable to that of the $As_2O_3$ cannot be obtained by addition in a small amount, but phase separation of the glass or devitrification by precipitation of the $SnO_2$ itself are brought about in the case of addition in a large amount.

Moreover, in the alkali free glass and the production method therefor disclosed in JP-A-10-231139, although a chloride is added at the same time as a refining agent in order to reinforce the refining effect of the $Sb_2O_3$, the refining effect of a chloride is not so remarkable. Furthermore, since hazardous chlorine gas and hydrogen chloride gas are generated by the decomposition thereof, a countermeasure therefor is required.

In the alkali free glass and the production method therefor disclosed in JP-A-9-110460, although a fluoride is added as a refining agent, the effect thereof is not so remarkable. Moreover, since hazardous fluorine gas and hydrogen fluoride gas are generated by the decomposition thereof, a countermeasure therefor is required.

Furthermore, in the alkali free glass and the production method therefor disclosed in JP-A-10-25132, although a sulfate and a chloride are added as the refining agent, the refining effect there of is not sufficient. Moreover, also in this case, similar to the case of the alkali free glass and the production method therefor disclosed in JP-A-10-231139, since hazardous chlorine gas and hydrogen chloride gas are generated by the decomposition of the chloride, a countermeasure therefor is required.

Moreover, in the alkali free glass and the production method therefor disclosed in JP-A-10-59741, although an $SnO_2$ is added as the refining agent, similar to the case of the alkali free glass and the production method therefor disclosed in JP-A-10-114538, the refining effect comparable to that of the $As_2O_3$ cannot be obtained by addition in a small amount, but phase separation of the glass or devitrification by precipitation of the $SnO_2$ itself are brought about in the case of addition in a large amount.

Furthermore, in the alkali free glass disclosed in the U.S. Pat. No. 6,096,670, although use of an $SnO_2$ and a $CeO_2$ in combination as the refining agent is disclosed. It is said that the cerium oxide exists in the form of a $CeO_2$ in the glass disclosed in the patent. However, even in an amount of about 0.5% of the upper limit, in the case the cerium exists in a tetravalent form, the glass is colored in yellow so that it is not preferable as a substrate for display, such as a TFT liquid crystal display. Moreover, a $ZrO_2$ is an essential component, and it is said to improve the chemical resistance and stabilize the $SnO_2$ and the $CeO_2$. However, the $ZrO_2$ tends to be precipitated in the glass as the devitrification. In particular, in the case of the down drawing method wherein the molten glass is cooled down to a low temperature until forming, the devitrification can be brought about by the precipitation.

SUMMARY OF THE INVENTION

Accordingly, an object of the invention is to provide an alkali free glass capable of solving the problems of the $As_2O_3$ substituent or $As_2O_3$, $Sb_2O_3$ substituent refining agents for the alkali free glass, with a quality usable as a substrate for a flat panel display, and a production method therefor.

A first aspect of the invention is an alkali free glass comprising:

(A) a composition including:
  50 to 70 wt % of $SiO_2$;
  7.5 to 20 wt % of $Al_2O_3$;
  4 to 15 wt % of $B_2O_3$;
  0 to 5 wt % ZnO; and
  5 to 30 wt % in total of at least one of MgO, CaO, SrO and BaO, in which an amount of MgO is 0 to 8 wt %, an amount of CaO is 0 to 10 wt % of CaO, an amount of SrO is 0 to 8 wt % and an amount of BaO is 0 to 15 wt %,
  wherein the composition shows a temperature for a viscosity at $10^2$ dPas being equal to or higher than 1,615° C., and the composition does not substantially contain each of $ZrO_2$ and an alkali metal oxide;
(B) total tin oxide in an amount of 0.1 to 2 wt %, as a refining agent, based on the weight of the composition (A); and
(C) at least one of total cerium oxide, total manganese oxide, total tungsten oxide, total tantalum oxide and total niobium oxide in an amount of 0.1 to 1 wt %, as a refining agent, based on the weight of the composition (A).

A second aspect of the invention is a method for producing an alkali free glass, comprising the steps of:

i) preparing a glass batch comprising: in terms of an oxide
  50 to 70 wt % of $SiO_2$;
  7.5 to 20 wt % of $Al_2O_3$;
  4 to 15 wt % of $B_2O_3$;
  0 to 5 wt % of ZnO; and
  5 to 30 wt % in total of at least one of MgO, CaO, SrO and BaO, in which an amount of MgO is 0 to 8 wt %, an amount of CaO is 0 to 10 wt % of CaO, an amount of SrO is 0 to 8 wt %, and an amount of BaO is 0 to 15 wt %,
  wherein the glass batch shows a temperature for a viscosity at $10^2$ dPas being equal to or higher than 1,615° C., and the glass batch does not substantially contain each of $ZrO_2$ and an alkali metal oxide;
ii) melting the glass batch; and
iii) forming the melted batch,
  wherein $SnO_2$ and at least one of $CeO_2$, $MnO_2$, $WO_3$, $Ta_2O_5$ and $Nb_2O_5$ are added to the glass batch as a refining agent in amounts of 0.1 to 2 wt % and 0.1 to 1 wt %, respectively, based on the weight of the glass batch.

In the invention, meaning of the total tin oxide and the $SnO_2$ in the invention is described (hereinafter the same is applied to the other refining components). These refining agents are added to the batch in the form of the highest valence number oxide ($SnO_2$ in the case of the tin oxide) among the stable oxides. These oxides provide the refining effect by releasing the oxygen at the time of temperature rise because the low valence number oxide becomes stable. Moreover, at the time of temperature reduce, since the original high valence number oxide becomes stable, a part thereof bonds with the residual oxygen remaining in the surrounding molten glass again so as to return to the original high valence number oxide. Therefore, the high valence number oxide and the low valence number oxide co-exist in the cooled glass, but it is difficult to determine the quantity of them independently. Here, in the glass composition, these oxides are described as the total tin oxide, and the content thereof is described by the amount in the case that all thereof exist as the high valence number oxide for the convenience.

The phrase: "do not substantially contain each of $ZrO_2$ and an alkali metal oxide" in the present specification means that each of $ZrO_2$ and an alkali metal oxide is not contained except for being contained as an impurity. The alkali free glass of the present invention does not include a glass batch, to which each of $ZrO_2$ and an alkali metal oxide is intentionally added.

In the alkali free glass of the invention, it is preferable that the total tin oxide content is 0.4 to 0.8 wt %, based on the weight of the composition (A).

Furthermore, it is preferable that at least one of the refining components used together with the total tin oxide is a cerium oxide, and the content thereof is more than 0.5%, based on the weight of the composition (A).

Moreover, in the method for producing an alkali free glass of the invention, it is preferable that the amount of the $SnO_2$ added as the refining agent is 0.4 to 0.8% by weight, based on the weight of the glass batch.

Furthermore, it is preferable that at least one of the refining components added together with the $SnO_2$ is a $CeO_2$, and the addition amount thereof is more than 0.5%, based on the weight of the glass batch.

Moreover, in the method for producing an alkali free glass, it is preferable that the forming step iii) is carried out by a down draw method.

A third aspect of the invention is a flat display panel comprising a pair of glass substrates opposed to each other and a closed space formed between the pair of glass substrates, wherein at least one of the pair of glass substrates is the alkali free glass according to the present invention.

DETAILED DESCRIPTION OF THE INVENTION

Hereinafter, the reason for limitation of the alkali free glass of the invention will be explained. The compositions mentioned below are described based on % by weight.

The $SiO_2$ is a component for forming a glass network. In the case the content thereof is less than 50%, the chemical resistance of the glass is deteriorated as well as the strain point is lowered so that a sufficient thermal resistance cannot be obtained. In the case it is more than 70%, the viscosity in the high temperature range becomes higher so that the melting operation becomes difficult.

The $Al_2O_3$ is a component for restraining the devitrification tendency of the glass as well as for improving the thermal resistance. In the case the content thereof is less than 7.5%, devitrification occurs easily. In the case it is more than 20%, the acid resistance is lowered as well as the melting become difficult.

The $B_2O_3$ is a component for improving the glass melting tendency, for restraining devitrification tendency, and for improving the chemical resistance, in particular the resistance to a buffered hydrofluoric acid. In the case the content thereof is less than 4%, the melting tendency of the glass is deteriorated as well as the resistance to a buffered hydrofluoric acid becomes insufficient. In the case it is more than 15%, the strain point is lowered so that the thermal resistance becomes insufficient.

At least one selected from the group consisting of MgO, CaO, SrO and the BaO is contained, and the total amount thereof is 5 to 30%. In the case it is less than 5%, the glass melting operation becomes difficult. In the case it is more than 30%, the expansion coefficient of the glass becomes too large.

The MgO is a component for improving the melting tendency of the glass without much lowering the strain point. However, in the case it is more than 8%, the devitrification temperature of the glass becomes higher. The preferable range is less than 5%. The CaO is a component having the same effect as that of the MgO. In the case it is contained more than 10%, the devitrification temperature of the glass becomes higher. The SrO is a component capable of improving the melting tendency without deteriorating the devitrification tendency of the glass. In the case it is contained by more than 8%, the expansion coefficient of the glass becomes too large. The preferable range is less than 5%. The BaO is a component capable of restraining the devitrification property of the glass. In the case it is more than 15%, the expansion coefficient of the glass becomes too large.

The ZnO is a component capable of restraining the devitrification tendency of the glass as well as improving the melting tendency. In the case it is contained by more than 5%, the strain point is lowered.

Moreover, the $TiO_2$ can be added up to about 5% within the range not deteriorating the function as a display substrate.

Next, the characteristic of the refining effect in the method for producing an alkali free glass according to the invention will be explained.

It is characteristic of the invention that the $SnO_2$ is used as the main refining agent, and the $CeO_2$, the $MnO_2$, the $WO_3$, the $Ta_2O_5$, and the $Nb_2O_5$ are used alone or a combination of a plurality in order to reinforce the function thereof and obtain a larger refining effect.

The $SnO_2$ provides the same refining effect as that of the $As_2O_3$ and the $Sb_2O_3$ of releasing the oxygen by the change of the stable state from the tetravalent to divalent by temperature rise, and thereby promoting a defoaming by growing bubbles existing in the glass molten liquid. However, since the temperature range of releasing the oxygen is higher than that of the $As_2O_3$ and the $Sb_2O_3$, it is most preferable for refining of glass of a composition having a temperature for a viscosity at $10^2$ dPas being equal to or higher than 1,615° C.; glass having a composition to be melted hardly, which is aimed at in the invention. In the case the amount of $SnO_2$ is less than 0.1%, the refining effect is insufficient even if the auxiliary components co-exist. In the case it is more than 2%, the glass is phase separated or devitrified by precipitation thereof. The preferable range thereof is 0.4 to 0.8%.

Moreover, in the case the glass forming method is a method of rapidly cooling the molten glass thereof from a temperature higher than the glass phase separation temperature or the devitrification temperature by a rate higher than the rate of causing the phase separation or the devitrification, such as a rollout method, by adding the $SnO_2$ in an amount close to the upper limit amount, it is possible to refine a glass of a highly thermally resistant composition, such as a composition having a temperature for viscosity at $10^2$ dPas being equal to or higher than 1,615° C. However, in the draw method, the float method, and in particular, the down drawing method capable of obtaining a high quality substrate glass, which are presently used as a forming method for such an alkali free glass, the cooling rate of the molten glass is slower than the rate of causing the phase separation or the devitrification in most cases. Therefore, it is substantially difficult to refine by only adding the $SnO_2$.

In the down drawing method, a molten glass is downwardly drawing from a slot so as to form the molten glass into a plate-like shape.

On the other hand, by use of at least one selected from the group consisting of $CeO_2$, $MnO_2$, $WO_3$, $Ta_2O_5$ and $Nb_2O_5$ in combination with the $SnO_2$, which is characteristic of the invention, a larger refining effect can be obtained by reinforcing the refining function. Forming can be enabled also in the case of the draw method, wherein the cooling rate of the molten glass is low, without the risk of phase separation or devitrification. The reason why the refining effect is promoted by adding these components alone or in a plurality in combination with the $SnO_2$ is not known. But it is considered that since the temperature range of releasing the oxygen by these oxides is lower than that of the $SnO_2$, the oxygen activity of the molten glass is made higher at the time of melting the material by the release of the oxygen by these components, and thereby the $SnO_2$ oxygen release is executed at a higher temperature and a lower rate so that it contributes further effectively to refining of a hardly melted composition with a high viscosity at a high temperature.

Moreover, as to the relationship between the tin oxide and the other oxides in terms of the valence number, since the glass is colored into yellow in the case the $CeO_2$ is added alone, it is considered to exist mainly in the tetravalent form on the higher valence number side. In contrast, since the glass can be transparent in the case it is added together with the $SnO_2$, it is considered that the Ce continues to exist mainly in the trivalent form on the lower valence number side, and the Sn returns to be in the tetravalent form on the higher valence number side by partially bonding with a dissolved oxygen again. In the case of the other oxides, although it cannot be presumed easily by the color, or the like, it is presumed that similarly the Sn is in the state partially returned to the tetravalent form on the higher valence number side, and the other oxides remain to exist mainly on the lower valence number side.

As a refining agent other than these, an $As_2O_3$, an $Sb_2O_3$, a chloride (such as a barium chloride), a fluoride (such as a calcium fluoride), a sulfate (such as a calcium sulfate), or the like, which are commonly used refining agents, may be added. However, since these refining agents are hazardous and generate a hazardous gas, it is preferable substantially not to added the same.

The flat display panel in the present invention includes a flat display panel such as a glass panel for TFT liquid crystal display.

Hereinafter, based on examples, the invention will be explained. A batch to have the composition shown in the Table 1 in terms of the oxides was prepared using a silica powder, an alumina, a boric acid, a basic magnesium carbonate, a calcium carbonate, a strontium nitrate, and a barium nitrate. To the batch, the additives shown in the Tables 2 and 3 were added and mixed well. (The tables are indicated by % by weight.)

TABLE 1

| SiO$_2$ | Al$_2$O$_3$ | B$_2$O$_3$ | MgO | CaO | SrO | BaO |
|---|---|---|---|---|---|---|
| 59.5 | 14.5 | 10.0 | 1.5 | 4.5 | 4.0 | 6.0 |

TABLE 2

| | SnO$_2$ | CeO$_2$ | MnO$_2$ | WO$_3$ | Ta$_2$O$_5$ | Nb$_2$O$_5$ |
|---|---|---|---|---|---|---|
| Example | | | | | | |
| 1 | 0.4% | 0.3% | 0 | 0 | 0 | 0 |
| 2 | 0.4% | 0.6% | 0 | 0 | 0 | 0 |
| 3 | 0.5% | 0 | 0.5% | 0 | 0 | 0 |
| 4 | 0.6% | 0 | 0 | 0.6% | 0 | 0 |
| 5 | 0.7% | 0 | 0 | 0 | 0.7% | 0 |
| 6 | 0.7% | 0 | 0 | 0 | 0 | 1.0% |

TABLE 3

| | As$_2$O$_3$ | SnO$_2$ | CeO$_2$ | MoO$_3$ |
|---|---|---|---|---|
| Comparative Example | | | | |
| 1 | 0 | 0 | 0 | 0 |
| 2 | 0.5% | 0 | 0 | 0 |
| 3 | 0 | 0.5% | 0 | 0 |
| 4 | 0 | 0 | 0.5% | 0 |
| 5 | 0 | 0.5% | 0 | 0.5% |

The batches prepared as mentioned above were melted at 1,600° C. for 4 hours using a platinum crucible. Then, the molten glass were poured onto a stainless steel plate and formed into a plate-like form. Then, they were cooled down gradually to a room temperature. Measurement results of the number and the size of bubbles contained in the obtained glasses are shown in the Tables 4 and 5. Since the density of the existing bubbles in the glass differs by the portion, and it is not homogeneous, the number of bubbles was measured at the same position by 1 to 5 cm square area at the center of the plate-like glass, and was converted to the number per 100 g. The temperature at which the glasses of the examples 1 to 6 and the comparative examples 1 to 3 have a viscosity of 10$^2$ dPas was about 1,650° C. in all cases.

TABLE 4

| | number of bubbles (pieces/100 g) | maximum bubble size ($\mu$m) | coloring |
|---|---|---|---|
| Example | | | |
| 1 | 2670 | about 800 | none |
| 2 | 860 | about 800 | none |
| 3 | 2650 | about 1000 | slightly greenish |
| 4 | 2330 | about 1000 | none |
| 5 | 2490 | about 1000 | none |
| 6 | 1250 | about 1000 | none |

TABLE 5

| | number of bubbles (pieces/100 g) | maximum bubble size ($\mu$m) | coloring |
|---|---|---|---|
| Comparative Example | | | |
| 1 | 10700 | about 100 | none |
| 2 | 670 | about 700 | none |
| 3 | 5300 | about 1000 | none |
| 4 | 8000 | about 200 | yellow |
| 5 | 10700 | about 100 | slightly yellowish |

As it is apparent from the examples 1 to 6 and the comparative examples 1 to 5 shown in the Tables 4 and 5, it is observed that the bubble elimination is promoted by adding the SnO$_2$ in combination with at least one selected from the group consisting of CeO$_2$, MnO$_2$, WO$_3$, Ta$_2$O$_5$ and Nb$_2$O$_5$, compared with the case of not adding an additive, the case of adding the CeO$_2$, the MoO$_3$, and the SnO$_2$ in an amount of 0.5% as the additive, or the case of adding the SnO$_2$ and the MoO$_3$ each in an amount of 0.5%. In particular, in the case of adding 0.4% of the SnO$_2$ and 0.6% of the CeO$_2$ in the example 2, it is observed that the refining effect comparable to the case of adding 0.5% of the As$_2$O$_3$ in the comparative example 2 can be obtained.

Moreover, the bubble size of the examples are larger than the case of not adding a refining agent, and the case of adding the CeO$_2$ alone, or adding the MoO$_3$ together with the SnO$_2$, and it is anticipated that the difference of the refining effect can further be widened by further prolonging the melting time.

Furthermore, since the glass is colored into yellow in the case of adding the CeO$_2$ alone by 0.5% in the comparative example 4, it is learned that the Ce in the glass exists mainly in the tetravalent form. In contrast, in the case of adding the SnO$_2$ and the CeO$_2$ in a combination in the examples 1 and 2, coloring is hardly observed in the glass, and thus it is learned that the Ce in the glass exists mainly in the trivalent form.

According to the invention, by adding the SnO$_2$ as a refining agent in combination with at least one of the CeO$_2$, the MnO$_2$, the WO$_3$, the Ta$_2$O$_5$, and the Nb$_2$O$_5$, bubble can be eliminated from a glass substantially not containing an alkali metal oxide, having a composition requiring a high melting temperature.

The entire disclosure of each and every foreign patent application from which the benefit of foreign priority has been claimed in the present application is incorporated herein by reference, as if fully set forth.

What is claimed is:

1. An alkali-free glass comprising:
   (A) a composition including:
      50 to 70 wt % of SiO$_2$;
      7.5 to 20 wt % of Al$_2$O$_3$;
      10 to 15 wt % of B$_2$O$_3$;
      0 to 5 wt % of ZnO; and
      5 to 30 wt % of at least one of MgO, CaO, SrO and BaO,
         in which an amount of MgO is 0 to 8 wt %, an amount of CaO is 0 to 10 wt %, an amount of SrO is 0 to 8 wt % and an amount of BaO is 0 to 15 wt %;
   wherein the composition shows a temperature for a viscosity at 10$^2$ dPas being equal to or higher than 1,615 ° C., and the composition does not substantially contain each of ZrO$_2$ and an alkali metal oxide;

(B) total tin oxide in an amount of 0.1 to 2 wt %, as a refining agent, based on the weight of the composition (A); and (C) at least one of total cerium oxide, total manganese oxide, total tungsten oxide, total tantalum oxide and total niobium oxide in an amount of 0.1 to 1 wt %, as a refining agent, based on the weight of the composition (A).

2. The alkali free glass according to claim 1, which comprises the total tin oxide (B) in an amount of 0.4 to 0.8 wt % based on the weight of the composition (A).

3. The alkali free glass according to claim 1, which comprises the total cerium oxide in an amount of more than 0.5 wt %, based on the weight of the composition (A).

4. A flat display panel comprising a pair of glass substrates opposed to each other and a closed space formed between the pair of glass substrates, wherein at least one of the pair of glass substrates is the alkali free glass according to claim 1.

5. A method for producing an alkali-free glass, comprising the steps of:

(i) preparing a glass batch comprising: in terms of an oxide
    50 to 70 wt % of $SiO_2$;
    7.5 to 20 wt % of $Al_2O_3$;
    10 to 15 wt % of $B_2O_3$;
    0 to 5 wt % of ZnO; and
    5 to 30 wt % in total of at least one of MgO, CaO, SrO and BaO, in which an amount of MgO is 0 to 8 wt %, an amount of CaO is 0 to 10 wt %, an amount of SrO is 0 to 8 wt % and an amount of BaO is 0 to 15 wt %,
wherein the glass batch shows a temperature for a viscosity at $10^2$ dPas being equal to or higher than 1,615° C., and the glass batch does not substantially contain each of $ZrO_2$ and an alkali metal oxide;

(ii) melting the glass batch; and (iii) forming the melted batch, wherein $SnO_2$ and at least one of $CeO_2$, $MnO_2$, $WO_3$, $Ta_2O_5$ and $Nb_2O_5$ are added to the glass batch as a refining agent in amounts of 0.1 to 2 wt % and 0.1 to 1 wt %, respectively, based on the weight of the glass batch.

6. The method for producing an alkali free glass according to claim 5, wherein $SnO_2$ in an amount of 0.4 to 0.8 wt % based on the weight of the glass batch is added to the glass batch.

7. The method for producing an alkali free glass according to claim 5, wherein $CeO_2$ in an amount of more than 0.5 wt % based on the weight of the glass batch is added to the glass batch.

8. The method for producing an alkali free glass according to claim 5, wherein the forming step iii) is carried out by a down drawing method.

* * * * *